(12) United States Patent
Hampton

(10) Patent No.: US 7,225,834 B2
(45) Date of Patent: Jun. 5, 2007

(54) RECREATIONAL VEHICLE VALVE AND CONNECTOR ASSEMBLY FOR RINSING A SEWER HOSE

(76) Inventor: Scott M. Hampton, 1644 Plaza Way, PMB 224, Walla Walla, WA (US) 99362

( * ) Notice: Subject to any disclaimer, the term of this patent is extended or adjusted under 35 U.S.C. 154(b) by 287 days.

(21) Appl. No.: 10/738,759

(22) Filed: Dec. 16, 2003

(65) Prior Publication Data

US 2005/0126644 A1 Jun. 16, 2005

(51) Int. Cl.
*B08B 9/032* (2006.01)

(52) U.S. Cl. ............... 137/614.2; 137/15.05; 251/118; 134/22.12; 134/166 C; 239/524; 239/590.3

(58) Field of Classification Search ............ 137/614.2, 137/15.05, 240; 239/590.3, 524, 462; 134/22.12, 134/166 C; 251/118, 127
See application file for complete search history.

(56) References Cited

U.S. PATENT DOCUMENTS

| | | | | |
|---|---|---|---|---|
| 2,553,888 A | * | 5/1951 | Barnes | 137/614.2 |
| 2,921,599 A | * | 1/1960 | Fleischman | 137/240 |
| 3,163,363 A | * | 12/1964 | Travis | 239/441 |
| 3,987,965 A | * | 10/1976 | Puma | 239/583 |
| 4,554,949 A | | 11/1985 | Sell | 137/899 |
| 4,688,833 A | | 8/1987 | Todd | 285/175 |
| 4,722,556 A | | 2/1988 | Todd | 285/12 |
| 5,094,278 A | * | 3/1992 | Arao et al. | 141/311 A |
| 5,323,813 A | | 6/1994 | Barrett | 137/899 |
| 5,324,001 A | | 6/1994 | Duke | 251/147 |
| 5,330,233 A | | 7/1994 | Kress | 285/9.2 |
| 5,417,460 A | | 5/1995 | Lunder | 285/253 |
| 5,653,262 A | | 8/1997 | Hanemaayer | 137/899 |
| 5,667,256 A | | 9/1997 | Caine | 285/148.23 |
| 6,006,766 A | | 12/1999 | Soulages | 134/166 |
| 6,047,736 A | | 4/2000 | Chiocchio | 137/899 |
| 6,240,986 B1 | | 6/2001 | Berkes et al. | 141/346 |
| 6,352,088 B1 | | 3/2002 | Stegall | 141/1 |
| 6,378,555 B2 | | 4/2002 | Kyle | 137/613 |
| 6,539,962 B2 | | 4/2003 | Paper et al. | 134/169 |

* cited by examiner

*Primary Examiner*—Eric Keasel
*Assistant Examiner*—Craig Schneider
(74) *Attorney, Agent, or Firm*—Floyd E. Ivey; Liebler, Ivey, Connor, Berry & St. Hilaire

(57) ABSTRACT

A valve and connector assembly for interconnection with and rinsing of sewage hoses including sewage discharge hoses and connectors for Recreational Vehicles. The assembly comprises a connector for interconnection with a sewage hose having connectors compatible with a RV sewage discharge valve. The assembly has a garden hose connector to receive a garden hose hookup to direct water into the contaminated sewage hose for rinsing prior to storage of the sewage hose. A diffuser within the connector causes the water stream to spray thereby rinsing the sewage hose.

7 Claims, 8 Drawing Sheets

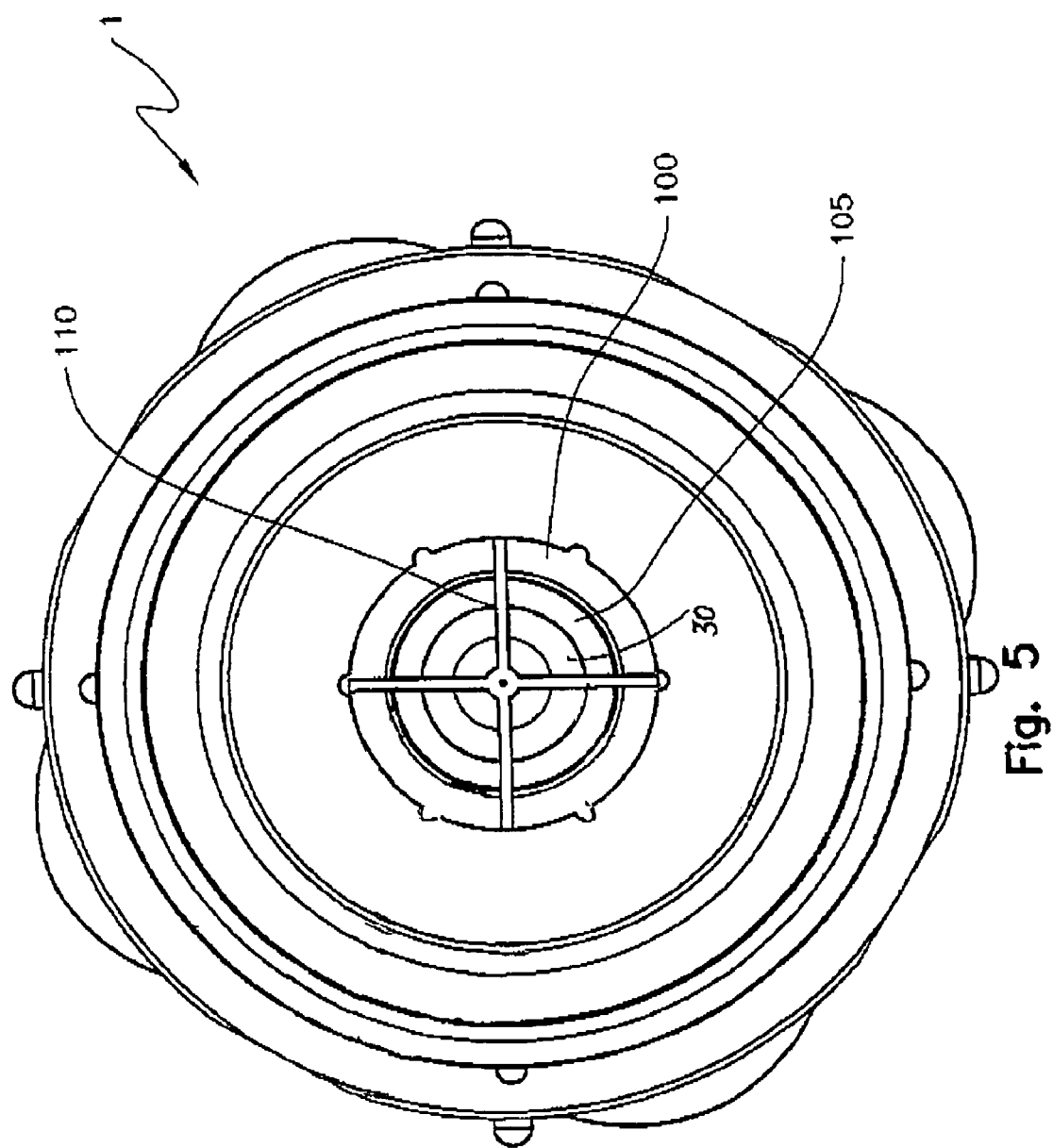

RECREATIONAL VEHICLE VALVE AND CONNECTOR ASSEMBLY FOR RINSING A SEWER HOSE

FIELD OF THE INVENTION

This invention relates to an apparatus for rinsing the sewer hose following discharge of an RV sewage holding tank. The invention, more particularly demonstrates the valve and connector assembly which facilitates the rinsing of the sewer hose used in the interconnection between a recreational vehicle and a municipal sewage system.

BACKGROUND OF THE INVENTION

Sewer interconnection hoses and connectors are shown in the prior art. Included are the following U.S. Pat. No. 6,539,962 to Paper et al.; U.S. Pat. No. 6,378,555 to Kyle; U.S. Pat. No. 6,352,088 to Stegall; U.S. Pat. No. 6,240,986 to Berkes et al.; U.S. Pat. No. 4,688,833 to Todd; U.S. Pat. No. 5,323,813 to Barrett; U.S. Pat. No. 6,047,736 to Chiocchio et al.; U.S. Pat. No. 6,006,766 to Soulages; U.S. Pat. No. 5,667,256 to Caine; U.S. Pat. No. 5,653,262 to Hanemaayer; U.S. Pat. No. 5,417,460 to Lunder; U.S. Pat. No. 5,330,233 to Kress; U.S. Pat. No. 5,324,001 to Duke; U.S. Pat. No. 4,722,556 to Todd; and U.S. Pat. No. 4,554,949 to Sell. The patents referred to herein are provided herewith in an Information Disclosure Statement in accordance with 37 CFR 1.97.

SUMMARY OF THE INVENTION

The sewage disposal from a recreational vehicle is generally accomplished via a hose interconnection between an RV sewage holding tank and a municipal sewage system. In many RV's, a sewage hose is stored in a bumper compartment. The sewage hose is connected, via a connector, to a holding tank exhaust valve with the hose routed to a municipal sewage receiving station. When the sewage hose is connected and positioned, the holding tank exhaust valve is opened causing the RV sewage to flow through the hose to the sewage receiving station. When the sewage holding tank is emptied the holding tank valve is closed and the hose is readied to be disconnected from the holding tank connection. When disconnected the sewage hose will contain some sewage.

This invention is a combination valve and connector assembly providing a connector to mate with the connector on the sewage hose. The valve and connector assembly has a standard garden hose receptacle with valve, a check valve or backflow preventer and a diffuser. When the sewage hose is disconnected from the holding tank connection, the operator immediately connects the sewage hose to the connector of this invention. The valve and connector assembly is then connected to a garden hose and water is directed into the sewage hose allowing the retained sewage to be discharged into the municipal receiving station. The valve and connector assembly and sewage hose is then stored in the RV storage compartment.

The invention also serves to cap the sewage hose when the sewage hose is stored or left connected to a municipal sewage system thereby eliminating order or spillage thereby complying with pertinent regulations. The valve and connector assembly also provides a more sanitary device to grasp for the extraction of the sewage hose from the RV stowage compartment.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 5 is a bottom view of the valve and connector assembly (1) illustrating the diffuser (100) with a diffuser vane formed as an "X" and the male connector (10).

DETAILED DESCRIPTION

Figure 1:
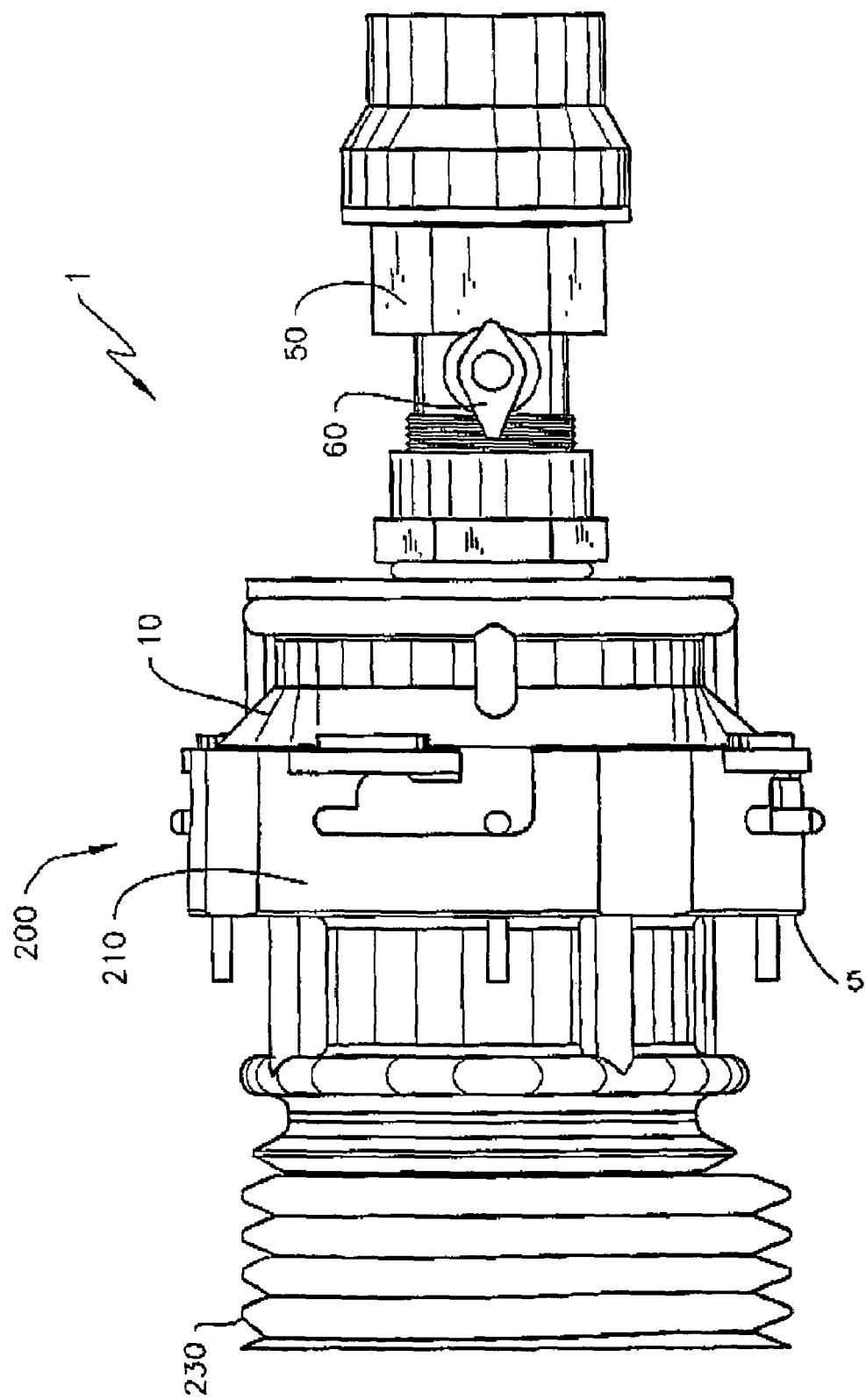
FIG. 1 illustrates a sewage hose (200) with a female connector (210), proximal the valve and connector assembly (1) of this invention, and a hose (230). Illustrated is the male connector (10) of the valve and connector assembly (1), the garden hose connector (50) and the garden hose valve inline valve (60).
Figure 2:
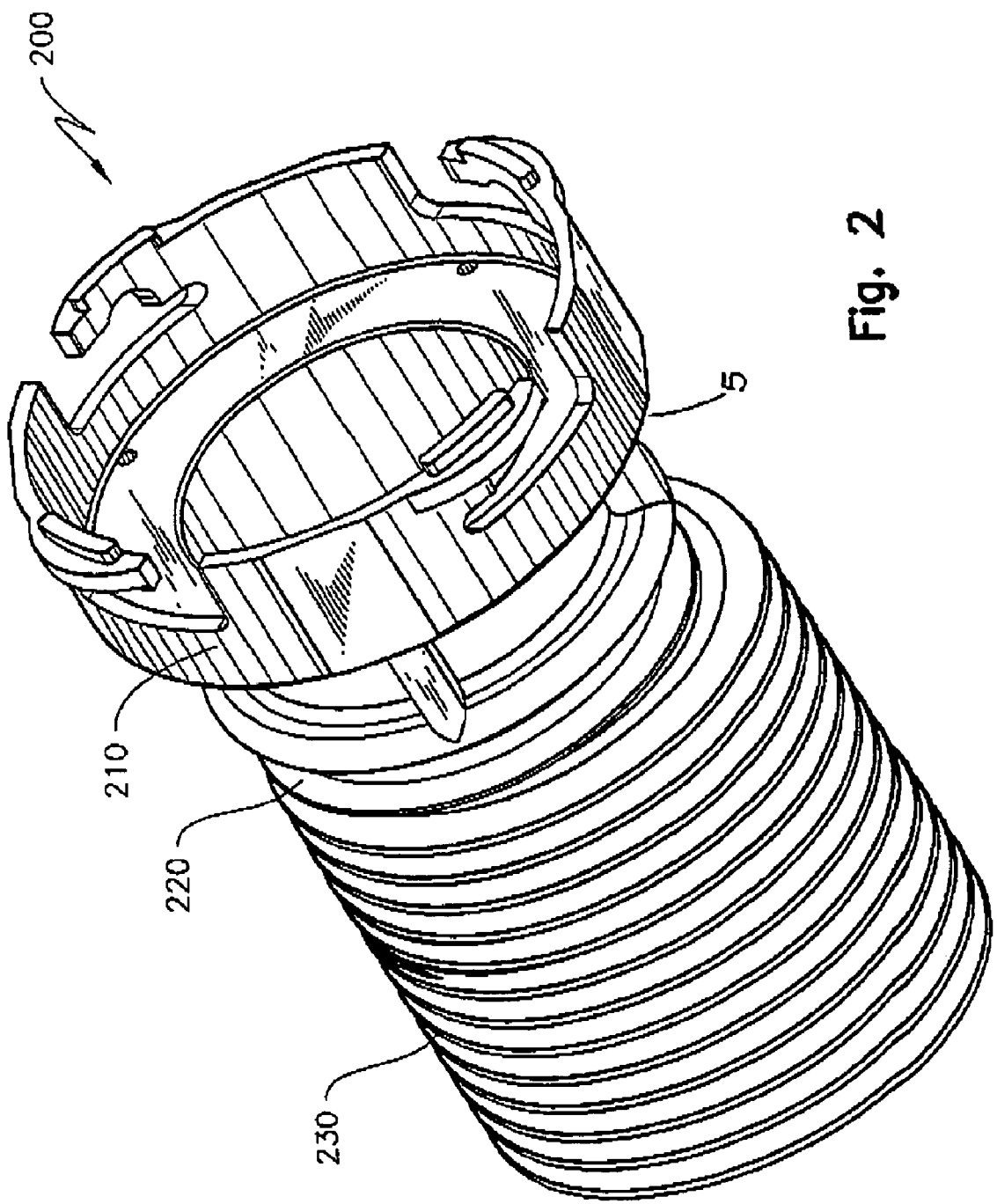
FIG. 2 illustrates the sewage hose (200) female connector (210) and hose (230) which will be connected to a RV sewage holding tank.
Figure 3:
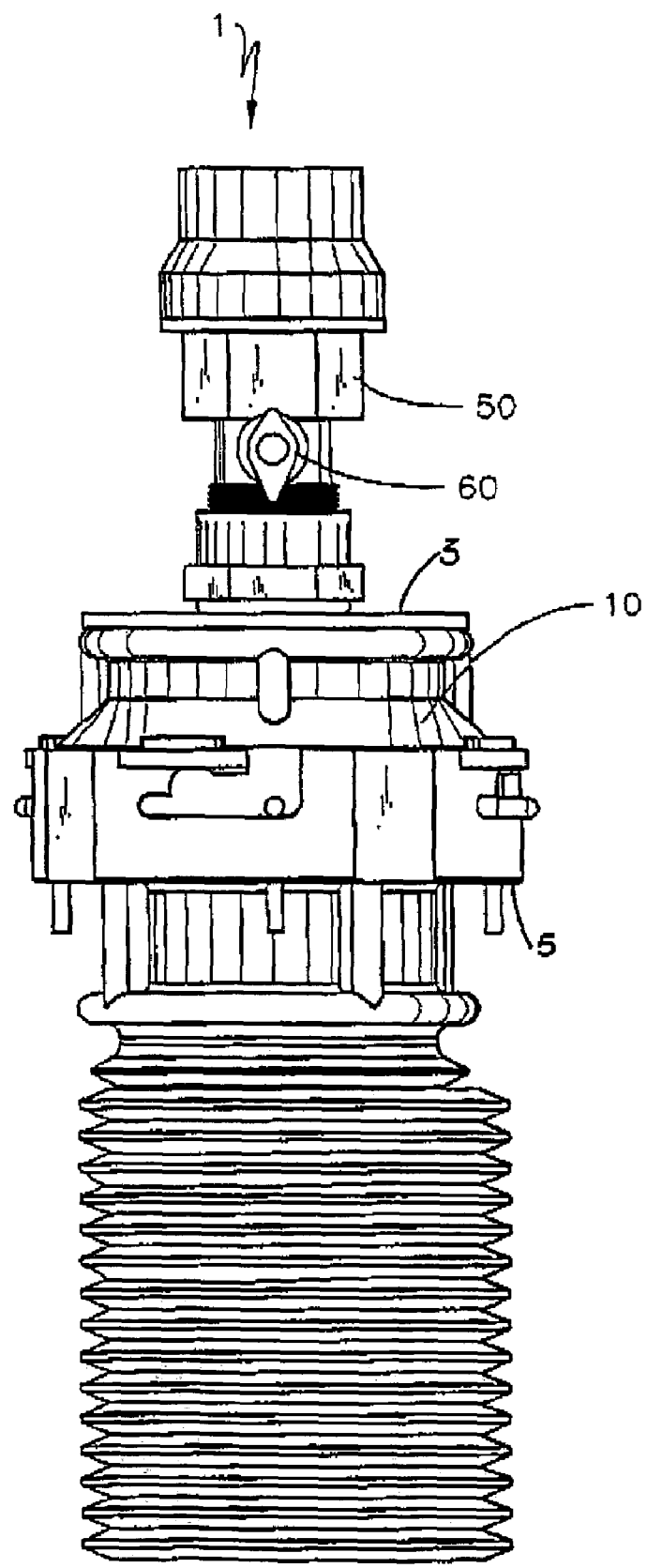
FIG. 3 is a front elevation of the valve and connector assembly (1) showing the male connector (10), the garden hose connector (50) and the garden hose inline valve (60).
Figure 4:
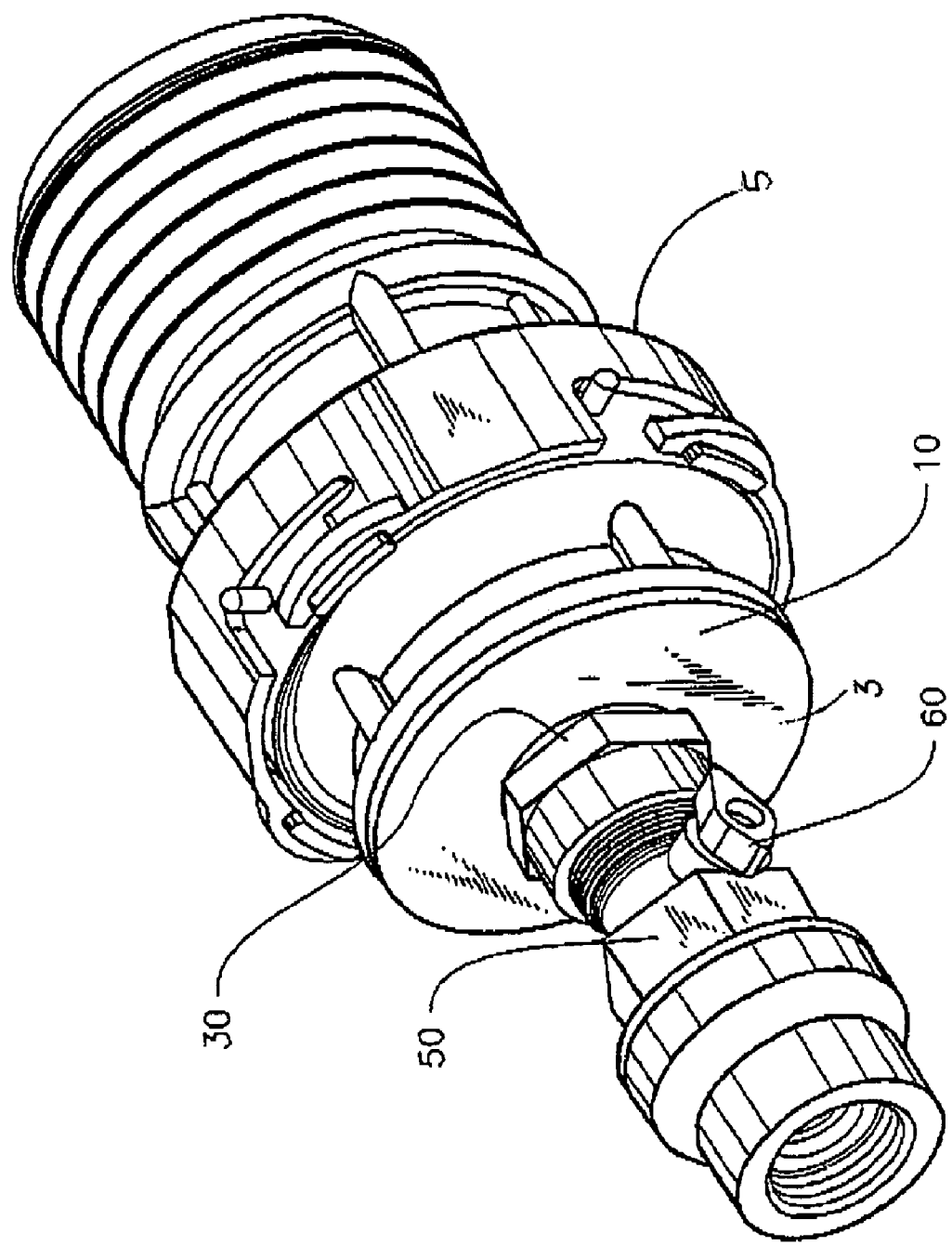
FIG. 4 is a top view of the valve and connector assembly (1) illustrating the garden hose connector (50), male connector (10), garden hose connector (50) and garden hose inline valve (60). Also illustrated is the diffuser (100).

FIGS. 1, 3, 4, 5 and 6 illustrates a valve and connector assembly (1) comprising a connector means (10) having a top (3) and a bottom (5); a valve mounting aperture (30) at the top (3); a fluid connection means (50) at the top (3) affixed by affixing means at the valve mounting aperture (30) with the fluid connection means (50) projecting away from the top (3); a fluid diffuser means (100) is affixed by affixing means at the valve mounting aperture (30) in fluid connectivity, by fluid connectivity means (40), with the fluid connection means (50); the fluid diffuser means (100) projects away from the fluid connection means (50) and toward the bottom (5).

FIGS. 1, 3, 4, 5 and 6 show the valve and connector assembly (1) of this invention illustrating a connector means (10) depicted, for illustrative purposes, as a male connector (10) having a top (3), a bottom (5) and a valve mounting aperture (30) at the top (3). Fluid connection means (50), depicted in the figures as a garden hose connector (50), will be recognized by those in the connector arts to include E-Z connectors, quick connectors, threaded/screw connectors and others which are equivalent. The figures depict a garden hose inline valve (60) and a diffuser (100). Also seen is a sewage hose (200) with a female connector (210) and hose (230) which is typical of that connected to a RV sewage holding tank for RV sewage disposal and which is connected to the valve and connector assembly (1) of this invention for sewage hose (200) rinsing and for sewage hose (200) storage.

Following discharge of a RV sewage holding tank, via the sewage hose (200), the sewage hose (200) is disconnected from the RV sewage holding tank in preparation for stowage in a sewage hose (200) stowage compartment on the RV. The sewage hose (200) retains some sewage, posing a contamination hazard to the RV operator, and must be rinsed prior to storage.

In the preferred embodiment the male connector (10) of the valve and connector assembly (1) of this invention is received by the female connector (210) of the sewage hose (200). The male connector (10) of the preferred embodiment is a quarter turn key lock connector mating with a female quarter turn key lock connector mounted on a RV sewage holding tank. However, those of ordinary skill in the connector arts will recognize that many styles of connectors may be employed on sewage holding tanks and that many styles of connectors may be employed as the connector means (10) of this invention. The connector means (10) thus employed will depend on that found on the RV and on the preferences of the operator. Styles of connectors suitable include, but are not limited to quarter turn key lock, E-Z couple bayonet, threaded, quick connection and others which will be appreciated by those of ordinary skills in the connection arts.

In the preferred embodiment the garden hose connector (50) is comprised of a standard garden hose connector (50). The garden hose inline valve (60) may be composed of a flow control hose end with a manually turned inline valve. Those of ordinary skills in the valve and connector arts will observe that alternative devices will provide an equivalent structure and such is claimed herein. In the preferred embodiment a check valve (150) is received by threaded means by the garden hose connector (50). The check valve (150) permits flow into the sewage hose (200) and prevents flow out of the sewage hose when the valve and connector assembly (1) of this invention is connected to the sewage hose connector (210).

In the preferred embodiment the diffuser (100) is interconnected by PVC or pipe thread and coupling means with the garden hose inline valve (60). In the preferred embodiment the thread and coupling means interconnecting the diffuser (100) and the garden hose inline valve (60) is also the point of interconnection with the connector (10).

Figure 6:
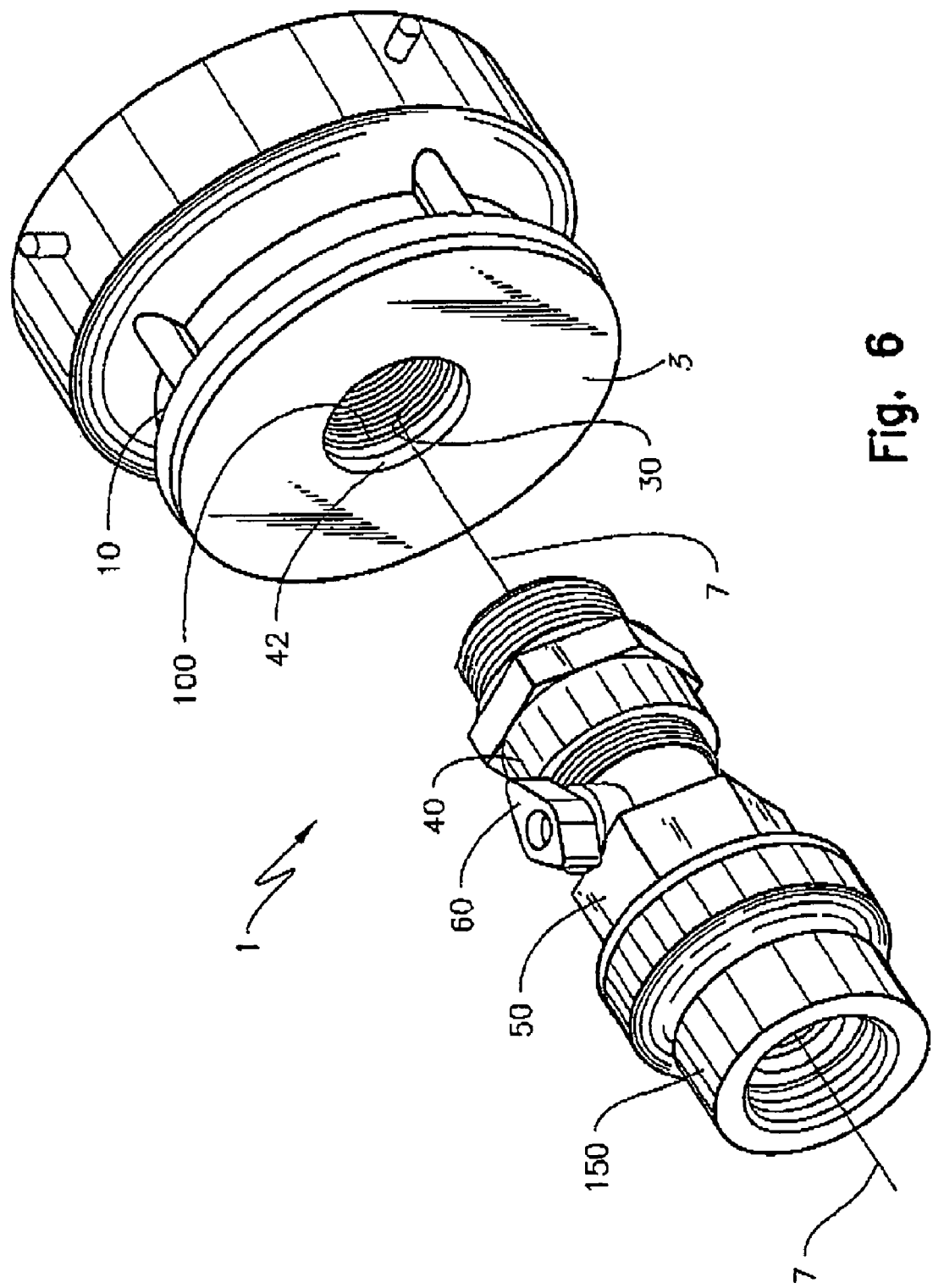
FIG. 6 is a perspective exploded view of the valve and connector assembly (1) showing the male connector (10), the valve mounting aperture (30), the garden hose connector (50), the garden hose inline valve (60), the diffuser (100) and a check valve (150).

The connector (10), having a top (3) and a bottom (5) is substantially enclosed at the top (3) and is substantially open at the bottom (5). Depicted in FIG. 6 is a valve mounting aperture (30) centrally positioned at the connector top (3). The aperture (30) receives the thread and coupling means interconnecting the diffuser (100) and the garden hose inline valve (60). The aperture (30) and the interconnected check valve (150), garden hose connector (50), inline valve (60), and diffuser (100) occupy a common centrally positioned axis (7). Gasket means (42) is employed to prevent sewage leakage from the sewage hose (200) when connected with the valve and connector assembly (1). In the preferred embodiment the diffuser (100) is distal from the check valve (150).

Figure 5B:
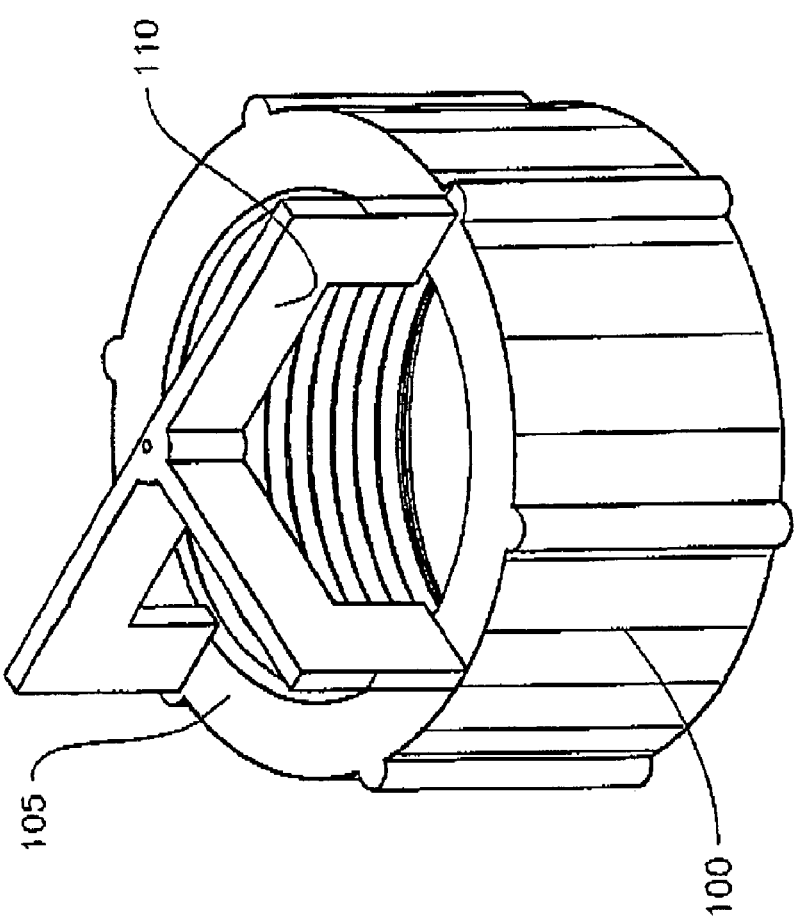
FIG. 5B is the depiction of an additional diffuser vane construction formed as a "Y".
Figure 5A:
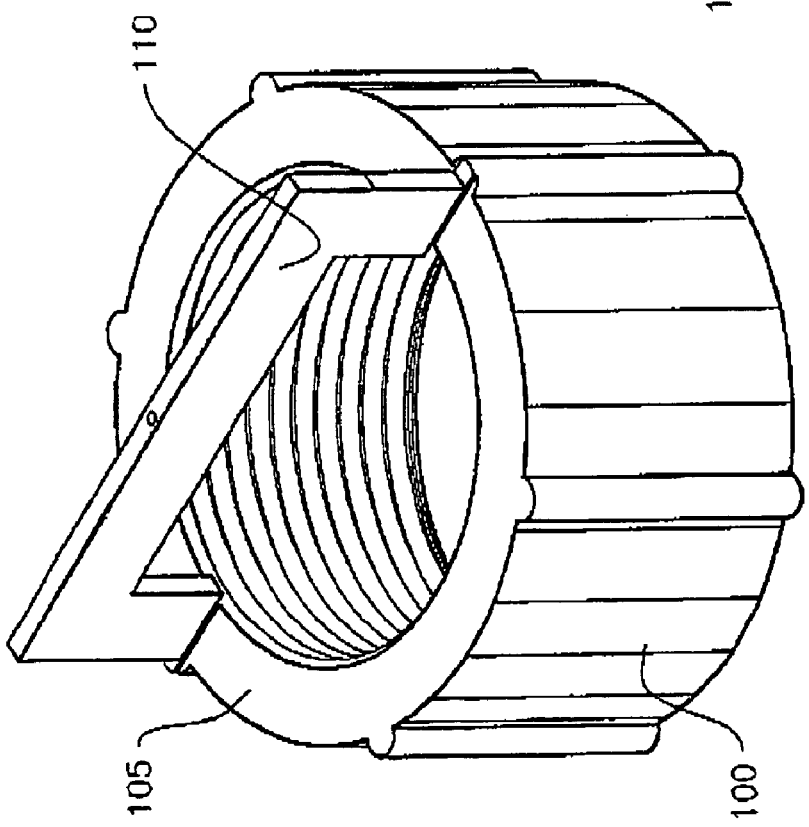
FIG. 5A is an illustration of an alternative diffuser vane construction.
Figure 5D:
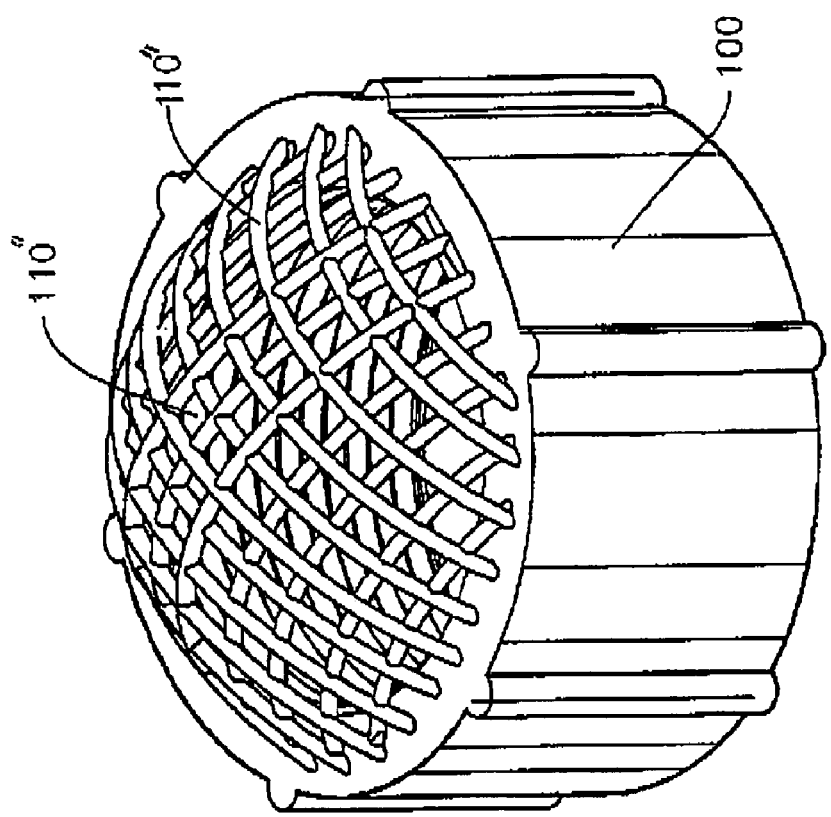
FIG. 5D is the depiction of an alternative diffuser with the diffuser vane formed as a grid.
Figure 5C:
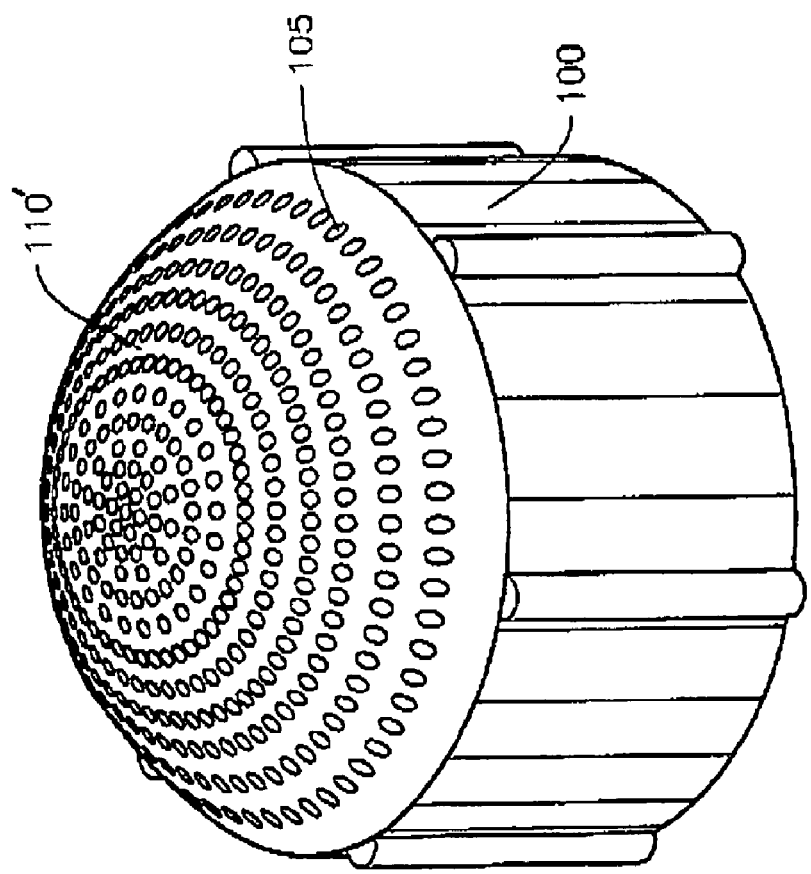
FIG. 5C is the depiction of an alternative diffuser with the diffuser vane formed as at least one perforation.

The garden hose water flow, when connected to the check valve (150), flows through the check valve (150), the garden hose connector (50), the inline valve (60) and through the diffuser (100) to the interior of the sewage hose (200). The garden hose water flow is deflected from a hose stream to a spray by encountering the at least one diffuser vane (110) at the diffuser (100). The diffuser vanes are most distal from the inline valve (60). The diffuser (100) is tubular having an outlet end (105). At least one diffuser vane (110), as depicted in FIG. 5A, is affixed by vane affixing means at the outlet end (105) generally orthogonal to the axis (7). In the preferred embodiment the at least one diffuser vane (110) forms an "X", as depicted in FIG. 5, where the legs of the "X" are generally orthogonal to the axis (7). In an alternative embodiment the at least one diffuser vane (110) may form a "Y" shape with the legs of the "Y" substantially orthogonal to the axis (7) as is depicted in FIG. 5B. The diffuser vane (110) disrupts the hose stream creating a spray directed against the inside of the sewage hose (200). FIGS. 5C and 5D depict the diffuser vane formed as perforations 110' or at least one perforation 110' and as a grid 110".

The connector top (3) is depicted as substantially planar. However, those of ordinary skills in the plastic injection molding arts will appreciate that the structure of the connector top (3) and valve mounting aperture (30) will vary with the demands of differing plastic injection molding limitations; it will be appreciated that other materials in addition to plastics will be employed for the construction of the connector (10) and to provide the structure required to fulfill the function of the valve mounting aperture (30) and that each such material will have limitations relative to the construction and interconnection between the valve mounting aperture (30) and the check valve(150), garden hose connector (50), inline valve (60) and diffuser (100) with the connector (10).

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A valve and connector assembly (1) comprising:
   a. a connector means (10) having a top (3) and a bottom (5); a valve mounting aperture (30) at the top (3);
   b. a fluid connection means received at the top (3) and affixed by affixing means at the valve mounting aperture (30); the fluid connection means (50) projecting away from the top (3);
   c. a fluid diffuser means (100) affixed by affixing means at the valve mounting aperture (30) in fluid connectivity with the fluid connection means (50) and projecting away from the fluid connection means (50) and toward the bottom (5);
   d. the connector means (10) comprising a male connector (10) having a top (3), a bottom (5) and a valve mounting aperture (30) at the top (3);
   e. fluid connection means (50) comprising a garden hose connector (50), an E-Z connector, a quick connector or a threaded/screw connectors;
   f. valve means (60) intermediate the fluid connection means (50) and the diffuser means (100);
   g. valve means (60) comprised of an inline valve (60);
   h. connector means (10) comprising E-Z couple bayonet, threaded or quick connection connector (10);
   I. the inline valve (60) comprised of a flow control hose end with a manually turned inline valve;
   j. a check valve (150) is received by valve connection means, including threaded means, by the fluid connection means (50); the check valve (150) oriented to prevent backflow out of the fluid connection means (50);

k. the diffuser (100) is fluid flow interconnected by PVC or pipe thread and coupling means with the fluid connection means (50) and the inline valve (60);
l. the thread and coupling means interconnecting the diffuser (100) and the inline valve (60) is also the point of interconnection with the connector means (10) at the valve mounting aperture (30);
m. the connector means (10) is substantially enclosed at the top (3) and is substantially open at the bottom (5);
n. the valve mounting aperture (30) is centrally positioned at the connector means top (3)
o. the valve mounting aperture (30) receives the thread and coupling means interconnecting the diffuser (100) and the inline valve (60);
p. the valve mounting aperture (30) and the interconnected check valve (150), garden hose connector (50), inline valve (60), and diffuser (100) occupy a common centrally positioned axis (7) and employ gasket means (42) to seal the valve mounting aperture (30), the interconnected check valve (150), fluid connection means (50), inline valve (60), and diffuser (100).

2. The valve and connector assembly of claim 1 further comprising:
a. the diffuser (100) is distal from the check valve (150);
b. the garden hose water flow, when connected to the valve and connector assembly (1) has fluid conductivity through the check valve (150), fluid connection means (50), the inline valve (60) and through the diffuser (100), and, when the connector means (50) is connected to a sewage hose (200), to the interior of the sewage hose (200).

3. The valve and connector assembly of claim 2 further comprising:
a. the garden hose water flow is deflected from a hose stream to a spray by encountering the at least one diffuser vane (110) at the diffuser (100).

4. The valve and connector assembly of claim 3 further comprising:
a. the diffuser vanes are most distal from the inline valve (60);
b. the diffuser (100) is tubular having an outlet end (105);
c. at least one elongated diffuser vane (110) is affixed by vane affixing means at the outlet end (105) generally orthogonal to the axis (7).

5. The valve and connector assembly of claim 4 further comprising:
a. the at least one elongated diffuser vane (110) forms an "X" at the outlet end (105);
b. the extensions of the "X" are legs; the legs of the "X" are generally orthogonal to the axis (7).

6. The valve and connector assembly of claim 4 further comprising:
a. the at least one elongated diffuser vane (110) forms a "Y" at the outlet end (105);
b. the extensions of the "Y" are legs; the legs of the "Y" are generally orthogonal to the axis (7).

7. The valve and connector assembly of claim 4 further comprising:
a. the at least one diffuser is a grid or is at least one perforation at the outlet end (105).

* * * * *